United States Patent [19]

Ross

[11] 4,094,809
[45] June 13, 1978

[54] PROCESS FOR SOLIDIFYING HIGH-LEVEL NUCLEAR WASTE

[75] Inventor: Wayne A. Ross, Richland, Wash.

[73] Assignee: The United States of America as represented by the United States Department of Energy, Washington, D.C.

[21] Appl. No.: 771,130

[22] Filed: Feb. 23, 1977

[51] Int. Cl.$^2$ .............................................. G21F 9/16
[52] U.S. Cl. ............................................ 252/301.1 W
[58] Field of Search ............................... 252/301.1 W

[56] References Cited

U.S. PATENT DOCUMENTS 3,110,557  11/1963  Spector ........................ 252/301.1 W

OTHER PUBLICATIONS

Bonniaud, R. et al., Chemical Abstracts 59, (1963), 9538f.

Primary Examiner—Richard E. Schafer
Assistant Examiner—Deborah L. Kyle
Attorney, Agent, or Firm—Dean E. Carlson; Frank H. Jackson; James W. Weinberger

[57] ABSTRACT

The addition of a small amount of reducing agent to a mixture of a high-level radioactive waste calcine and glass frit before the mixture is melted will produce a more homogeneous glass which is leach-resistant and suitable for long-term storage of high-level radioactive waste products.

6 Claims, No Drawings

PROCESS FOR SOLIDIFYING HIGH-LEVEL NUCLEAR WASTE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a process for solidifying high-level radioactive wastes for storage. More specifically, this invention relates to an improvement in the process for preparing glasses for storage from calcined high-level radioactive wastes and glass frit.

The chemical reprocessing of spent nuclear reactor fuel elements to recover the unburned nuclear reactor fuel material generates aqueous solutions containing radioactive wastes. The aqueous waste solutions contain nitric acid and present difficult problems in their handling and storage. Since it is necessary to store these radioactive wastes for extremely long periods of time to permit decay of the highly radioactive fission products included in the wastes, the aqueous wastes are converted to solid form which, in addition to occupying less volume than the corresponding liquid wastes, is less corrosive and more durable for handling and long-term storage. These aqueous radioactive waste solutions can be converted to a solid form by several processes such as spray solidification, fluidized-bed calcination and pot calcination.

In order to protect the environment and prevent the escape of highly radioactive material from the long-term storage facilities, it is necessary that the stored solid be highly impervious to attack by outside influences which may be present in the storage facility, such as water. Since most calcines contain leachable material, it becomes necessary that they either be stored in suitable containers or converted into a chemically inert substance. However, since container materials are subject to corrosion and may ultimately leak and allow the escape of radioactive material into the environment, it is preferred that the material placed in the container also be chemically inert. For this reason, considerable effort is being made to develop economical and effective processes for converting the highly radioactive calcines into glass. Conversion of calcines into glass is attractive because glass is relatively inexpensive, inert and generally resistant to leaching. Glass is easy to prepare to mixing the calcine with a glass frit, which is a mixture of silica and fluxes such as boron oxide and sodium oxide which, when melted with the calcine, will form glass, melting the resulting mixture to form the molten glass and pouring the molten glass into a metal storage container to form a glass casting containing the highly radioactive solid waste materials. It has been found that glasses prepared from calcines formed from high-level radioactive wastes from power reactors, separated into two phases when solidified rather than forming a single liquid phase — the second upper phase being highly leachable, thus rendering the glass unacceptable for the storage of radioactive wastes. Tests showed that this second phase is $(Na,K) MoO_4$ containing some strontium and cesium and resulted from reaction between molybdenum fission products generally present as molybdenum (VI) compounds, the calcine and alkali metals found in both the calcine and the glass frit.

A number of methods have been tried to remedy the problem, but none has been completely successful. For example, phosphate glasses have been tried; however, they are more readily subject to devitrification whereupon they become highly leachable. Attempts have been made to change the composition by decreasing the sodium content or increasing the boron oxide content — neither of which produced completely satisfactory results. Another solution is to dilute the calcine more by increasing the amount of glass present — but this increases the cost of the glass and greatly increases the amount of waste for which expensive storage must be provided.

SUMMARY OF THE INVENTION

It has been found that, by adding small amounts of a reducing agent to the radioactive calcine and glass frit mixture before melting, it is possible to eliminate formation of sodium and potassium molybdates by reduction of the molybdenum (VI) compounds in the calcine to lower valences which dissolve or disperse in the glass, thus forming a glass matrix having leach-resistant phases suitable for long-term storage of high level radioactive wastes.

An additional benefit obtained by adding small amounts of a reducing agent to the calcine-frit mixture is that the amount of energy required to melt the mixture is reduced because of the exothermic reaction between the reducing agent and the $MoO_3$. For example, the addition of about 1.5 weight percent of silicon to the mixture will produce about 25% of the heating requirements necessary to melt the mixture.

It is therefore one object of the invention to provide an improved method for preparing a glass containing high level radioactive waste which is suitable for long-term storage.

It is a further object of the invention to provide an improved method for preparing a glass from high level radioactive waste containing molybdenum which has leach-resistant phases and is suitable for long-term storage of high-level radioactive wastes.

It is still another object of the invention to provide an improved method for preparing a glass from calcined high level radioactive wastes containing molybdenum and glass frit containing alkali metals which is suitable for long-term storage of high-level radioactive wastes.

Finally, it is the object of the invention to provide a method for preparing a glass for long-term storage of high-level radioactive wastes in which some of the required heat is supplied by an exothermic reaction.

DESCRIPTION OF THE PREFERRED EMBODIMENT

These and other objects of the invention for preparing a leach-resistant glass suitable for the long-term storage of high level radioactive wastes from a radioactive waste calcine containing molybdenum (VI) compounds and a glass frit containing alkali metals by adding to the calcine-glass frit mixture about 0.5 to 1.5 weight percent of elemental silicon or silicon carbide as a reducing agent, heating the mixture to melting temperature thereby forming molten glass, the reducing agent reducing the molybdenum (VI) compounds to lower valence states which dissolve or disperse in the molten glass and which when cooled form a leach-resistant solid containing high level radioactive wastes suitable for long-term storage.

The reducing agent may be any element with a free energy of formation higher than molybdenum, such as zirconium, yttrium, chromium, aluminum, titanium, or silicon, or carbon and carbon-containing compounds such as cornstarch and silicon carbide. Of these, silicon metal and silicon carbide are preferred. The amount of reducing agent which must be added is an effective amount to reduce the molybdenum (VI) compounds, which are generally present as molybdenum trioxide, to a lower valence state, such as molybdenum dioxide, molybdenum sesquioxide or the metal. However, since there are other compounds present in the mixture which will be reduced by the reducing agent before the $MoO_3$, it is necessary to add an effective amount to reduce all compounds in the mixture which have energies of formation up to and including molybdenum. In practice, it has been found adequate to add a weight percentage of reducing agent to the mixture. For example, ¾ to 3, preferably 1 to 1½, weight percent of silicon has been found adequate, while ½ to 1 weight percent of silicon carbide is sufficient to reduce all compounds up to molybdenum. It is important not to add too much reducing agent to the mixture, since this will reduce compounds which are present which have energies of formation greater than molybdenum, such as zinc or cesium, which will not dissolve in the molten glass but which will volatilize and could release radioactivity from the cesium to the environment.

It is preferred that the reducing agent be finely divided so that it will readily react in the calcine-frit mixture as it is being heated to melting temperature. Generally −325 U.S. mesh size was found to completely react during the melting period, thus ensuring complete reduction.

The method of this invention is operable for any highly radioactive waste calcine which contains molybdenum (VI) compounds such as molybdenum trioxide. In Table I below are given two typical high-level radioactive waste compositions which may result from the reprocessing of irradiated nuclear power reactor fuels.

TABLE I

| | | WASTE COMPOSITIONS | |
|---|---|---|---|
| | | PW-7a, as defined | PW-8a as defined |
| Inerts | $Na_2O$ | 6.872* | 14.057 |
| | $Fe_2O_3$ | 3.022 | 27.225 |
| | $Cr_2O_3$ | 0.345 | 1.151 |
| | NiO | 0.141 | 0.566 |
| | $P_2O_5$ | 6.339 | 1.342 |
| | $Al_2O_3$ | — | — |
| | $Gd_2O_3$ | 10.360 | — |
| Fission Products | $Rb_2O$ | 0.354 | 0.354 |
| | SrO | 1.059 | 1.059 |
| | $Y_2O_3$ | 0.598 | 0.598 |
| | $ZrO_2$ | 4.944 | 4.944 |
| | $MoO_3$ | 5.176 | 5.176 |
| | $Tc_2O_7$ | 1.291 | 1.291 |
| | $RuO_2$ | 2.972 | 2.972 |
| | $Rh_2O_3$ | 0.480 | 0.480 |
| | PdO | 1.483 | 1.483 |
| | $Ag_2O$ | 0.088 | 0.088 |
| | CdO | 0.097 | 0.097 |
| | $TeO_2$ | 0.725 | 0.725 |
| | $Cs_2O$ | 2.880 | 2.880 |
| | BaO | 1.567 | 1.567 |
| | $La_2O_3$ | 1.480 | 1.480 |
| | $CeO_2$ | 3.323 | 3.323 |
| | $Pr_6O_{11}$ | 1.482 | 1.482 |
| | $Nd_2O_3$ | 4.522 | 4.522 |
| | $Pm_2O_3$ | 0.123 | 0.123 |
| | $Sm_2O_3$ | 0.924 | 0.924 |
| | $Eu_2O_3$ | 0.200 | 0.200 |
| | $Gd_2O_3$ | 0.137 | 0.137 |
| Actinides | $U_3O_8$ | 11.689 | 11.689 |
| | $NpO_2$ | 0.865 | 0.865 |

TABLE I-continued

| | WASTE COMPOSITIONS | |
|---|---|---|
| | PW-7a, as defined | PW-8a as defined |
| $PuO_2$ | 0.103 | 0.174 |
| $Am_2O_3$ | 0.181 | 0.181 |
| $Cm_2O_3$ | 0.040 | 0.040 |
| Total | 75.862 | 93.2 |

*Kilograms waste oxide produced per metric ton uranium reprocessed. Burnup presumed is 33,000 megawatt days.

Suitable glass frit compositions may contain any number of components but generally are tailored to fit the particular waste composition in order to result in a glass having the characteristics desirable to enable it to be used for long time storage of high level radioactive wastes. Several suitable frit compositions are given in Table II below.

TABLE II

| | Battelle Northwest Frit No. 73-1 | 76-101[b] | 76-199[c] |
|---|---|---|---|
| $SiO_2$ | 37.0%[a] | 59.7 | 53.0 |
| $B_2O_3$ | 15.1% | 14.2 | 14.0 |
| $Na_2O$ | 5.5% | 11.2 | 12.0 |
| $K_2O$ | 5.5% | — | 3.0 |
| ZnO | 28.9% | 7.45 | — |
| CaO | 2% | 3.0 | 3.0 |
| MgO | 2% | — $Al_2O_3$ | 1.5% |
| SrO | 2% | — $CuO_2$ | 4.5% |
| BaO | 2% | — | — |
| $TiO_2$ | | 4.45 | 9.0 |

[a] all compositions are given in weight percent
[b] especially useful with waste PW-8a
[c] especially useful with waste PW-7a The calcine to frit ratios vary with frit and waste compositions, however, generally they may vary from 1 part calcine to 4 parts frit to 1 part calcine to 1 part frit with generally 1 part calcine to 2 parts frit preferred.

The melting of the calcine-frit mixture containing the reducing agent may be done by any convenient means known to those skilled in the art for handling radioactive materials. For example, the high-level radioactive waste solution may be handled by a system of spray calcination with in-can melting as described on pages 175 to 179 of CONF 76-0701 — "Proceedings of the International Symposium on the Management of Wastes from the LWR Fuel Cycle." In this system, the high-level waste solution is sprayed into a heated wall calciner where it is rapidly calcined, falling to the bottom of the calciner to be mixed with a glass frit which then falls into a metal storage container set in a furnace wherein it is melted, forming the glass, and sealed ready for storage. Another method described on pages 179 and 180 of the above publication is a Joule-heated ceramic melter in which the ceramic-frit mixture is continuously added to the top of the melter while the molten glass is drawn from the bottom of the melter directly into a storage container.

The following examples are given as illustrative of the process of the invention and are not to be taken as limiting the scope of the process as defined by the appended claims. It is obvious that the composition of the wastes and frits may change as new and improved glass formations are developed.

EXAMPLE I

In-can melting run number 12 is summarized in Table III. This run was made to further evaluate methods for prevention of the formation of soluble molybdate phases in the product during melting and to evaluate the effects on the process of these methods. The methods used included the addition of 1.5 weight percent, −325 mesh, silicon metal to the batch. The simulated waste calcine PW-7a, the frit, and the silicon were blended in a mixer. Two lots were prepared using two different frit mesh sizes so that the effects of this parameter on product homogeneity could be evaluated. The canister was charged with 19.7 kg of batch prepared with the larger mesh frit and lowered into the furnace which was preheated to 1060° C. Approximately 3½ hrs. were required to melt this batch which gives a melting rate of 5.5 kg/hr. Twenty-three kilograms of batch were then rapidly fed to the canister and melted in 3 hrs. which gives a melting rate of 7.7 kg/hr. Batch was then fed at rates between 13 and 17.6 kg/hr and melting kept up with the feed rate until it approached 17.6 kg/hr. The canister surface temperatures were maintained at 1065° C while these rates were being determined.

Although foaming of the initial batch was anticipated, it did not occur. The atmosphere above the melt was not filled with entrained solids and only traces of Si and Zn in excess of what is present in calcine were found in the deposits on the filters. Bubbles less than ½ inch in diameter did burst at the melt surface during the melting. Some of the bubbles burst leaving a dark pocket in the melt, while others burst with a bluewhite flame which heated the pocket to a brighter orange color than was the surrounding melt. The presence of an exothermic reaction was also evidenced by the relatively low power requirements of the furnace during melting. Fourteen to sixteen kilowatts are usually required while only 10 to 13 kw were used during the melting of ICM-12. The melt was held at 1055° C for 2 hours after the last of the batch was fed to the canister and before the programmed cooling was started.

The product of ICM-12 contained no visible molybdate phase separation and there were no cerium oxide clusters visible in the glass or settled at the bottom of the melt. The product was heterogeneous, with small crystals dispersed through the glass matrix. No variations in product heterogeneity could be correlated with the changes in frit size.

The density of the product was lower than that of product produced during earlier runs, which had densities as high as 3.7 g/cc. The upper third of the glass contained many small bubbles, the frequency of occurrence of which increases as the top of the melt is approached. These bubbles indicate a longer fining period is required for this composition. The product has good leach resistance.

TABLE III
SUMMARY OF IN-CAN MELTING RUN-12

| Run Number | ICM-12 |
|---|---|
| Date of Run | 8-19-75 |
| Coupled to | Vibra Screw Feeder |
| Off-gas Treatment | Spray Calciner Filters |
| Canister | |
| Diameter, inch | 8 Sch. 40 |
| Length, inch | 48 |
| Wall Thickness, inch | 0.32 |
| Material | 304L SS |
| Fins | None |
| Batch | |
| Waste Type | PW-7a-2 |
| Waste Form | Spray Dried Calcine |
| Waste Oxide-to-Frit Ratio | 1:2 |
| Frit Type | 75-75 |
| Frit Form, mesh | −6/+20 and −325 |
| Additives | 1.5 wt% Silicon (−325 mesh) |
| Batch Preparation | Mechanically Blended |
| Operating Parameters | |
| Time at Melt Temperature, Hr. | 8 |
| Surface Temperature Range, °C | 1000–1085 |
| Nominal Melt Temperature, °C | 1050–1065 |
| Batch Feed Method | Batch and Continuous |
| Batch Conditioning | Preblended |
| Max. Batch Feed Rate, kg/hr | 17.6 |
| Melting Rate, kg/hr | 7.7 Batch and 14 Continuous |
| Max. Power Consumption, kw | 13.4 |
| Cooling Rate, °C/hr | |
| 1025 to 750° C | 48 |
| 750 to 500° C | 20 |
| 500 to 100° C | 7 |
| Product | |
| Type | PW-7a-2(1:2) 75-75 + 1.5% Si |
| Weight, kg | 49.9 |
| Volume, | 19.2 |
| Bulk Density, g/cc | 2.60 |
| Apparent Density, g/cc | |
| Top | 2.54 |
| Middle | 3.19 |
| Bottom | 3.26 |
| Leach Rate, Soxhlet, grams per sq cm per day | |
| Top | $4.2 \times 10^{-6}$ |
| Middle | $5.3 \times 10^{-6}$ |
| Bottom | $6.5 \times 10^{-6}$ |

The process of this invention is not limited to the production of glass from calcined waste and glass frit mixtures but may also find utility for the reduction of any molybdenum (VI) compounds which are troublesome in the processing of other radioactive waste forms.

As can be seen from the preceding discussion and example, the process of the invention provides an improved method for preparing leach-resistant glasses suitable for the long-term storage of high level radioactive waste materials.

The embodiments of the invention in which an exclusive property or privilege is claimed are defined as follows:

1. In the process of solidifying high-level radioactive waste solutions containing molybdenum (VI) for long-term storage by heating the waste solutions to calcining temperatures whereby the solutions are dried to form a radioactive calcine, mixing the calcine with a glass frit containing alkali metals to form a mixture, heating the mixture to melting temperature to form a molten glass and cooling the molten glass to form a solid containing high-level radioactive waste, the improvement comprising adding to the calcine-frit mixture before melting, an effective amount of reducing agent having a free energy of formation higher than molybdenum to reduce the molybdenum (VI) compounds to a lower valence state whereby the molybdenum (VI) compounds are reduced to a lower valence state which dissolves or disperses in the molten glass whereby the molten glass when cooled forms a leach-resistant solid containing high-level radioactive waste suitable for long-term storage.

2. The improvement process of claim 1 wherein the reducing agent is selected from the group consisting of elemental silicon, aluminum, zirconium, chromium, titanium, carbon and silicon carbide.

3. The process of claim 2 wherein the reducing agent is from ¾ to 3 weight percent of the calcine-frit mixture.

4. The process of claim 3 wherein the reducing agent is a powder −325 mesh in size.

5. The process of claim 3 wherein the mixture contains from 1 to 1½ weight percent of −325 mesh elemental silicon.

6. The process of claim 3 wherein the mixture contains from ½ to 1 weight percent of −325 mesh silicon carbide.

* * * * *